United States Patent
Yamamoto

(10) Patent No.: US 9,348,207 B2
(45) Date of Patent: May 24, 2016

(54) ILLUMINATING OPTICAL SYSTEM AND PROJECTION DISPLAY APPARATUS

(71) Applicant: FUJIFILM Corporation, Tokyo (JP)

(72) Inventor: Chikara Yamamoto, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 516 days.

(21) Appl. No.: 13/949,901

(22) Filed: Jul. 24, 2013

(65) Prior Publication Data
US 2013/0308103 A1 Nov. 21, 2013

Related U.S. Application Data

(63) Continuation of application No. PCT/JP2012/000874, filed on Feb. 9, 2012.

(30) Foreign Application Priority Data

Feb. 10, 2011 (JP) .................. 2011-027001

(51) Int. Cl.
| | |
|---|---|
| *G03B 21/14* | (2006.01) |
| *G03B 21/20* | (2006.01) |
| *F21V 8/00* | (2006.01) |
| *F21K 99/00* | (2016.01) |
| *H04N 9/31* | (2006.01) |
| *G02B 27/09* | (2006.01) |

(52) U.S. Cl.
CPC ............... *G03B 21/208* (2013.01); *F21K 9/52* (2013.01); *G02B 6/0001* (2013.01); *G02B 6/0096* (2013.01); *G02B 27/0905* (2013.01); *G02B 27/0994* (2013.01); *G03B 21/2013* (2013.01); *G03B 21/2033* (2013.01); *H04N 9/3152* (2013.01)

(58) Field of Classification Search
CPC ........... G03B 21/2013; G03B 21/2033; G03B 21/206; G03B 21/208; G02B 27/0994; G02B 27/1006; H04N 9/3152; H04N 9/3161; H04N 9/317
USPC ............ 353/31, 34, 37, 94, 38; 362/227, 230, 362/231, 234, 249.2
See application file for complete search history.

(56) References Cited

U.S. PATENT DOCUMENTS

| | | | |
|---|---|---|---|
| 2004/0133191 A1 | 7/2004 | Momiuchi et al. | |
| 2005/0128441 A1* | 6/2005 | Morgan ............. | G03B 21/2033 353/102 |

(Continued)

FOREIGN PATENT DOCUMENTS

| | | |
|---|---|---|
| JP | 2000-131665 | 5/2000 |
| JP | 2002-189263 | 7/2002 |
| JP | 2004-208903 | 7/2004 |

*Primary Examiner* — William C Dowling
(74) *Attorney, Agent, or Firm* — Young & Thompson

(57) ABSTRACT

An illuminating optical system suppresses deterioration in utilization efficiency of illuminating light and generation of fluctuations in light emission without increasing apparatus size. The illuminating optical system includes a plurality of light sources of different types, a light combining optical system that combines light beams output from each of the light sources such that they converge at a single position, and a rod integrator that uniformizes the light intensity distributions of the light beams which are converged at the single position that enter a first end thereof and outputs the light beams, of which the light intensity distribution has been uniformized, from a second end thereof. The light combining optical system includes relay optical component sets corresponding to each of the light sources, and the relay optical component sets have relay magnification ratios different from each other.

18 Claims, 4 Drawing Sheets

(56) References Cited

U.S. PATENT DOCUMENTS

| | | | |
|---|---|---|---|
| 2006/0170884 A1 | 8/2006 | Liu | |
| 2012/0327374 A1* | 12/2012 | Kitano | G03B 21/16 353/31 |
| 2014/0098349 A1* | 4/2014 | Nagasawa | G03B 21/2033 353/31 |
| 2015/0029466 A1* | 1/2015 | Sakata | H01S 5/1092 353/31 |

* cited by examiner

EXAMPLE 1

EXAMPLE 2

ILLUMINATING OPTICAL SYSTEM AND PROJECTION DISPLAY APPARATUS

CROSS REFERENCE TO RELATED APPLICATIONS

This application is a continuation of PCT/JP2012/000874 filed on Feb. 9, 2012, which claims foreign priority to Japanese Application No. 2011-027001 filed on Feb. 10, 2011. The entire contents of each of the above identified applications are hereby incorporated by reference.

BACKGROUND OF THE INVENTION

1. Field of the Invention

The present invention is related to an illuminating optical system and a projection display apparatus. More specifically, the present invention is related to an illuminating optical system that passes light output from light sources through a rod integrator to uniformize the distribution of light intensity and outputs the uniformized light, and a projection display apparatus that employs the illuminating optical system.

2. Description of the Related Art

Conventionally, there are known projection display apparatuses that modulate light beams output by light sources with light modulating elements such as DMD's (Digital Micromirror Devices) such that the light beams represent image information, and project the modulated light beams onto screens to display the image information.

In such projection display apparatuses, density fluctuations and color fluctuations are generated in image information displayed on screens if there are fluctuations in the distributions of light intensity of illuminating light beams that illuminate the light modulating elements. Therefore, there is demand to uniformize the light intensity distributions of the illuminating light beams.

Rod integrators are known as optical elements which can be employed to uniformize the distributions of light intensity of illuminating light beams. Rod integrators uniformize light intensity distributions by passing light beams that enter thereinto along a unidirectionally extending optical path while causing the light beams to reflect therein. Rod integrators are capable of forming the light beams input thereto into the cross sectional shape of the rod integrators and outputting light beams having uniformized light intensity distributions.

In rod integrators that output illuminating light beams (illuminating light) of which the light intensity distributions have been uniformized, the uniformity of the light intensity distributions of the illuminating light beams can be improved as the lengths of the rod integrators becomes greater in relation which the diameters thereof. This is because the number of times that light reflects within the rod integrators as they propagate therethrough increases as the lengths of the rod integrators become greater.

The light emitting surfaces of rod integrators and light modulating elements are placed in an optically coupled relationship, and the light modulating elements are illuminated by the illuminating light beams of which the light intensity distributions have been uniformized. Thereby, the illuminating light beams are modulated by the light modulating elements, become light beams that represent image information, are projected onto a screen, and display the image information on the screen without density fluctuations or color fluctuations.

Solid rod integrators formed by transparent members and hollow cylindrical rod integrators having mirrors as interior surfaces are known as rod integrators that uniformize the light intensity distributions of illuminating light beams.

Further, an illuminating optical system that combines a plurality of light beams output from a plurality of light sources using a cross prism, then passes the combined light beams through a rod integrator to form illuminating light beams is known (refer to Japanese Unexamined Patent Publication No. 2002-189263). In addition, an illuminating optical system that passes a plurality of light beams output from a plurality of light sources through rod integrators individually, then combines the light beams which are output from the rod integrators to form illuminating light beams is known (refer to U.S. Patent Application Publication No. 20060170884).

SUMMARY OF THE INVENTION

When a plurality of light beams output from at least one light source and another light source of a different type are caused to pass through a single rod integrator via relay lenses having magnification ratios of 1× to form an illuminating light beam, there are cases in which the quality of the illuminating light beam deteriorates. Particularly, the quality of an illuminating light beam becomes more likely to deteriorate when light beams output from a plurality of light sources of different types are caused to pass through a single rod integrator via relay lenses having a magnification ratio of 1× to form the illuminating light beam.

If the spreading angles of light beams output from light sources are small, the converging angles of the light beams that enter a rod integrator via relay lenses become small. Therefore, the number of times that the light beams are reflected within the interior of the rod integrator decreases. Accordingly, the light intensity of an illuminating light beam output from the rod integrator after passing therethrough becomes non uniform, and fluctuations are generated in the light intensity distribution thereof.

Conversely, if the spreading angles of light beams output from light sources are great, the converging angles of the light beams that enter a rod integrator via relay lenses become great. Therefore, the number of times that the light beams are reflected within the interior of the rod integrator increases, and light propagation loss due to decreased reflectance, etc. increases. Accordingly, the utilization efficiency of an illuminating light beam output from the rod integrator after passing therethrough deteriorates.

If the spreading angles of light beams output from light sources differ, fluctuations are generated in the light intensity distribution of a formed illuminating light beam for the reasons stated above.

In addition, if the sizes of light emitting regions of light sources differ, the sizes of optical images of the light emitting regions formed by light beams that enter a rod integrator will also differ. As a result, the incident states of light beams (light rays) that enter the rod integrator will differ for each light source. In such a case, the light intensity distribution of an illuminating light beam output from the rod integrator after passing therethrough will be a different distribution for each light source. For this reason, if the size of a rod integrator is determined according to a light source having a large light emitting region, the rod integrator becomes large, resulting in the entirety of an apparatus becoming large. Conversely, if the size of a rod integrator is determined according to a light source having a small light emitting region, light beams from larger light sources cannot be effectively utilized, and loss will occur in the amount of light.

Further, in the case that a plurality of light sources each emit light beams of colors different from each other and there are differences in the spreading angles of the light beams or the sizes of the light emitting regions of the light sources are different, color fluctuations will be generated in addition to the problems described above. That is, a portion of image information which is to be displayed as white will be displayed in a reddish color or displayed in a bluish color.

There is demand to miniaturize projection display apparatuses. Therefore, there is demand to suppress deterioration in the utilization efficiency of illuminating light beams and illumination fluctuations (light intensity fluctuations and color fluctuations) without extending the lengths of rod integrators or employing a plurality of rod integrators, that is, without causing apparatuses to become large.

The problems of deterioration in the utilization efficiency of illuminating light beams and illumination fluctuations are not limited to cases in which illuminating optical systems are applied to projection display apparatuses, but are common in illuminating optical systems.

The present invention has been developed in view of the foregoing circumstances. It is an object of the present invention to provide an illuminating optical system that suppresses deterioration in utilization efficiency of illuminating light beams and generation of fluctuations in light emission without increasing apparatus size. It is another object of the present invention to provide a projection display apparatus that employs the illuminating optical system.

An illuminating optical system of the present invention comprises:

a plurality of light sources including at least one light source which is of a different type than other light sources;

a light combining optical system that combines light beams output from the light sources such that they converge at a single position; and a rod integrator that uniformizes the light intensity distributions of the light beams which are converged at the single position that enter a first end thereof and outputs a light beam, of which the light intensity distribution has been uniformized, from a second end thereof;

the light combining optical system comprising relay optical component sets corresponding to each of the light sources; and at least one of the relay optical component sets having a relay magnification ratio different from those of other relay optical component sets.

The illuminating optical system of the present invention may adopt a configuration, in which the relay magnification ratios satisfy conditional formula (A): BH/BL>1.05, wherein BH is the highest relay magnification ratio from among the relay magnification ratios of the relay optical component sets, and BL is the lowest relay magnification ratio from among the relay magnification ratios of the relay optical component sets.

In the case that the light sources of different types are those that have light emitting regions of different sizes, it is desirable for the relay magnification ratios of the relay optical component sets to be set such that the sizes of optical images of the light emitting regions which are formed when the light beams pass through the relay optical component sets are matched.

In the case that the light sources of different types are those that output light beams having different spreading angles, it is desirable for the relay magnification ratios of the relay optical component sets to be set such that the converging angles of the light beams that enter the rod integrator are matched.

In the case that the light sources of different types are those that have light emitting regions of different sizes and/or those that output light beams having different spreading angles, it is desirable for the relay magnification ratios of the relay optical component sets to be set such that the sizes of optical images of the light emitting regions which are formed when the light beams pass through the relay optical component sets and the converging angles of the light beams that enter the rod integrator become balanced.

The expression "the relay magnification ratios of the relay optical component sets to be set such that the sizes of optical images of the light emitting regions which are formed when the light beams pass through the relay optical component sets and the converging angles of the light beams that enter the rod integrator become balanced" means that "the relay magnification ratios are set such that the sizes of the optical images and the converging angles result in smaller variations in the light intensity distribution of a (combined) light beam formed by passing the light beams through the rod integrator".

The light sources of different types may be those that output light of different colors.

A lens which is provided most proximate to the rod integrator from among the relay optical component sets may be utilized in common by all of the relay optical component sets.

It is desirable for the lengths of the optical paths from each of the plurality of light sources to a light input surface of the rod integrator to be the same.

The light sources may be LED light sources.
The light sources may be laser light sources.
The rod integrator may be a solid rod.
The rod integrator may be a hollow rod.

A projection display apparatus of the present invention comprises:

the illuminating optical system of the present invention;

light modulating elements which are illuminated by an illuminating light beam output by the illuminating optical system that modulate the illuminating light beam; and a projection lens that projects light beams which are modulated by the light modulating elements that represent image information.

In the illuminating optical system and the projection display apparatus of the present invention, at least one relay optical component set has a relay magnification ratio different from those of others. Therefore, deterioration in utilization efficiency of illuminating light beams and generation of illumination fluctuations can be suppressed, without increasing apparatus size.

That is, each relay portion has a relay magnification ratio which is adjusted such that the incident state of each light beam into the rod integrator becomes favorable. Accordingly, the above advantageous effects can be obtained.

For example, in the case that the spreading angles of light beams output from each light source are different, the relay magnification ratios of each relay optical component set can be adjusted such that the converging angles of the light beams that enter the rod integrator will be matched at a desirable size. Therefore, the propagation efficiency of the light beams within the rod integrator can be improved, the utilization efficiency of light output from the light sources can be improved, and the generation of illumination fluctuations can be suppressed.

As another example, in the case that the sizes of the light emitting regions of each light source are different, the relay magnification ratios of each relay optical component set can be adjusted such that the sizes of the optical images of the light emitting regions which are focused after passing through the relay optical component sets will be matched at a desirable size. Therefore, the apparatus size can be kept small and generation of light amount loss can be suppressed.

For the reasons stated above, deterioration in the utilization efficiency of illuminating light beams and illumination fluctuations (light intensity fluctuations and color fluctuations) can be suppressed without adopting a configuration that increases apparatus size, such as extending the lengths of rod integrators or employing a plurality of rod integrators.

DESCRIPTION OF THE PREFERRED EMBODIMENTS

Figure 1:
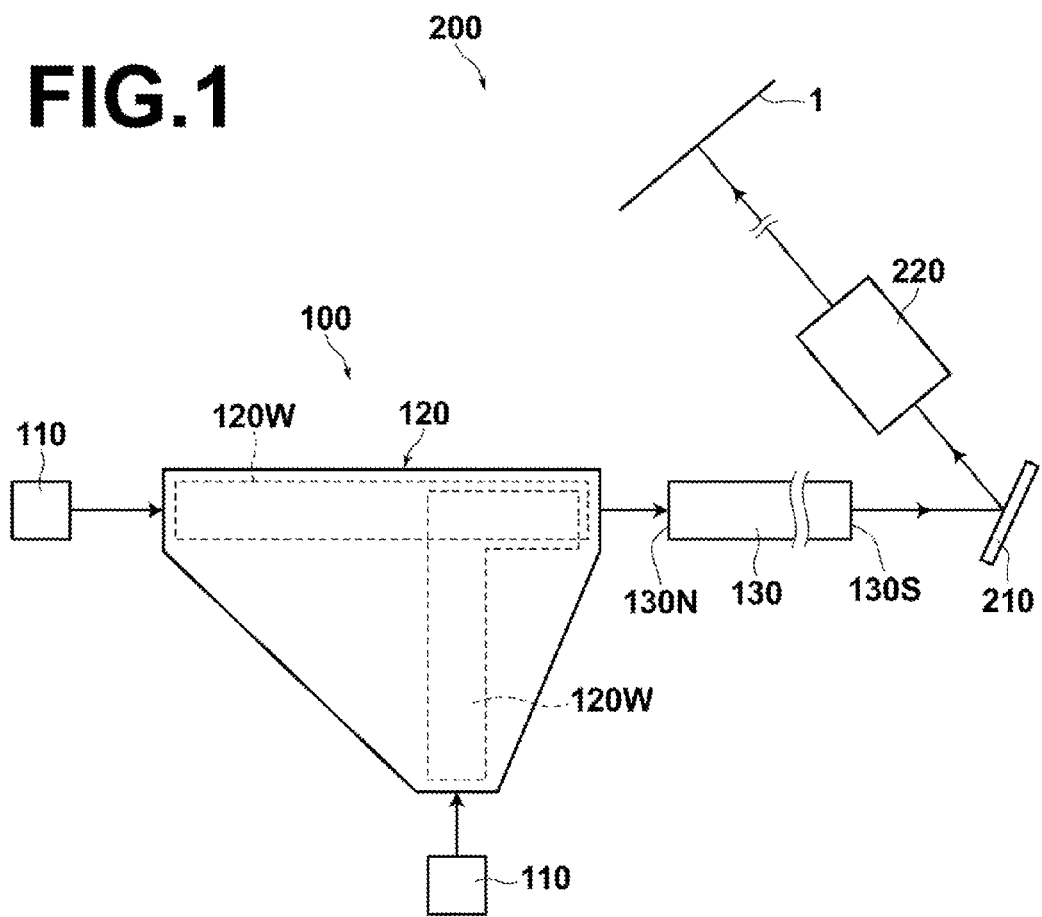
FIG. 1 is a diagram that illustrates the schematic structure of an illuminating optical system and a projection display device according to an embodiment of the present invention.

Hereinafter, illuminating optical systems of the present invention and projection display apparatuses equipped with the illuminating optical systems will be described with reference to the attached drawings. FIG. 1 is a diagram that illustrates an illuminating optical system 100 and a projection display device 200 according to an embodiment of the present invention.

The illuminating optical system 100 of FIG. 1 is equipped with: a plurality of light sources 110 including at least one light source which is of a different type than other light sources (here, the plurality of light sources will be collectively referred to as "light sources 110"); a light combining optical system 120 that combines light beams output from the light sources 110 such that they converge at a single position; and a rod integrator 130 that uniformizes the light intensity distributions of the light beams which are converged at the single position that enter a first end thereof and outputs a light beam, of which the light intensity distribution has been uniformized, from a second end thereof.

Note that the "plurality of light sources 110 including at least one light source which is of a different type than other light sources" may be "a plurality of light sources each of different types", "a plurality of light sources including at least light sources of different types", "a plurality of light sources including at least one light source and another light source of a different type from the at least one source", or "a plurality of light sources in which at least one light source is of a type different from that of other light sources".

The light combining optical system 120 has a plurality of relay optical component sets 120W (here, the plurality of relay optical component sets will collectively be referred to as "relay optical component sets 120W") which are provided for each light source. The relay optical component sets 120W include relay optical component sets having relay magnification ratios different from each other and relay optical component sets having the same relay magnification ratio. The light combining optical system 120 combines the light beams output from the light sources 110 and converges the light beams at the center of a light input surface 130N of the rod integrator 130.

The phrase "different types" means that the sizes of the light emitting regions of the light sources or the spreading angles of the light beams output by the light sources are different. Light sources of different formats, such as LED light sources, laser light sources, ultra high pressure mercury lamps, and xenon lamps, may be adopted as light sources of different types.

In addition, the plurality of light sources 110 of different types may be light sources of the same format (LED light sources, for example) having different sizes of light emitting regions or different spreading angles of light beams.

Note that the light sources of different types are light sources such as those described below. That is, the light sources of different types are those that result in illuminating light beams having different light intensity distributions when each light source is placed at predetermined positions, and light beams output therefrom are passed through the same optical path (the same relay optical component sets and the rod integrator) to form the illuminating light beam.

In addition, the projection display apparatus 200 of the embodiment of the present invention is equipped with: the illuminating optical system 100; light modulating elements 210 which are illuminated by the illuminating light beam output by the illuminating optical system 100; and a projection lens 220 that projects light beams which have been modulated by the light modulating elements 210 and that represent image information. The projection display apparatus 200 forms an optical image that represents the image information on a screen 1 via the projection lens 220.

The relay magnification ratios of the relay optical component sets 120W that constitute the light combining system 120 may be set such that the sizes of the optical images of the light emitting regions of each light source 110 which are focused by passing through the relay optical component sets 120W are matched, or such that the converging angles of the light beams that enter the rod integrator 130 are matched. In addition, the relay magnification ratios of the relay optical component sets may be set such that the sizes of optical images of the light emitting regions which are formed when the light beams pass through the relay optical component sets 120W and the converging angles of the light beams that enter the rod integrator become balanced.

Note that the relay magnification ratios of the relay optical component sets 120W may be set by other standards, as long as deterioration in the utilization efficiency of an illuminating light beam and generation of illumination fluctuations can be suppressed without increasing the size of the apparatus.

The "size of the light emitting region of the light source" and the "size of the optical image of the light emitting region" are the sizes in a direction perpendicular to the direction of the optical axis. The sizes may be the lengths or the areas in the direction perpendicular to the direction of the optical axis.

That the "sizes of the optical images of the light emitting regions are matched" means that the differences in sizes among the optical images of the light emitting regions become smaller than the differences in the sizes among the light emitting regions of the light sources. For example, the sizes of the optical images of the light emitting regions can be matched by setting the relay magnification ratios such that the ratio between the maximum size and the minimum size of the optical images become closer to 1 than the ratio between the maximum size and the minimum size of the light emitting regions.

In addition, that the "converging angles are matched" means that means that the differences among the converging angles of the light beams when they enter the rod integrator become smaller than the differences among the spreading angles of the light beams output by the light sources. For example, the converging angles can be matched by setting the relay magnification ratios such that the ratio between the maximum and the minimum converging angles become closer to 1 than the ratio between the maximum and minimum spreading angles.

The illuminating optical system 100 may be configured such that the highest relay magnification ratio BH and the lowest relay magnification ratio BL from among the relay magnification ratios set for each of the relay optical component sets 120W satisfy Conditional Formula (A): BH/BL>1.05.

Further, if the illuminating optical system 100 is configured to satisfy Conditional Formula (A1): BH/BL≥1.2, it can be expected that illumination fluctuations can be suppressed to a greater degree. If the illuminating optical system 100 is configured to satisfy Conditional Formula (A2): BH/BL≥1.8, it can be expected that illumination fluctuations can be suppressed to an even greater degree.

Note that if the illuminating optical system 100 is configured to satisfy Conditional Formula (A'): 5.0≥BH/BL>1.05, Conditional Formula (A1'): 5.0≥BH/BL≥1.2, or Conditional Formula (A2'): 5.0≥BH/BL≥1.8, illumination fluctuations can be more positively suppressed. Here, if the illuminating optical system 100 is configured such that BH/BL exceeds the upper limits of Conditional Formula (A'), Conditional Formula (A1'), or Conditional Formula (A2'), spatial arrangement of the portions of the relay optical component sets at which the light beams are combined will become difficult.

The light sources 110 may be those that output light having colors different from each other. In the case that light sources that output light having colors different from each other are employed, color fluctuations, which are readily visually discernable, appear as light intensity fluctuations of the illuminating light beam output from the rod integrator 130. Therefore, the illuminating optical system 100 can significantly exhibit the effect of suppressing the generation of color fluctuations.

A lens which is provided most proximate to the rod integrator 130 from among the relay optical component sets 120W may be utilized in common by all of the relay optical component sets 120W.

It is desirable for the lengths of the optical paths from each of the plurality of light sources 110 to the light input surface of the rod integrator 130 to be the same. Thereby, the interchangeability of the component parts of the illuminating optical system 100 can be improved, and apparatus cost can be reduced.

Note that the "lengths of the optical paths" are actual lengths, and not air conversion lengths.

The rod integrator 130 may be a solid rod or a hollow rod.

Hereinafter, the operation of the illuminating optical system and the projection display apparatus equipped with the illuminating optical system will be described.

The light beams output from the plurality of light sources 110 of different types respectively pass through the relay optical component set 120W which are provided for each light source 110, are combined, and enter the light input surface 130N of the rod integrator 130.

Here, the relay magnification ratios of each of the relay optical component sets 120W are set such that the sizes of the optical images of the light emitting regions of each light source 110 that enter the rod integrator 130 and the converging angles of the light beams match. Deterioration of the utilization efficiency of the illuminating light beam and the generation of illumination fluctuations can be suppressed without increasing the apparatus size, by setting the relay magnification ratios in this manner.

Each of the light beams that enter the rod integrator 130 through the light input surface 130N and propagate therethrough are output from a light output surface 130S of the rod integrator 130 after the light intensity distributions thereof are uniformized.

The illuminating light beam of which the light intensity distributions has been uniformized and is output from the light output surface 130S of the rod integrator, that is, the illuminating light beam in which variations in light intensity distributions have been suppressed, enter the light modulating elements 210, and are modulated into light beams that represent image information by the light modulating elements 210.

The light beams which have been modulated by the light modulating elements 210 and represent the image information are projected onto the screen 1 through the projection lens 220.

Thereby, a brighter optical image (an optical image that represents the image information), in which density fluctuations and color fluctuations are suppressed, can be formed on the screen 1.

Example 1

Figure 2:
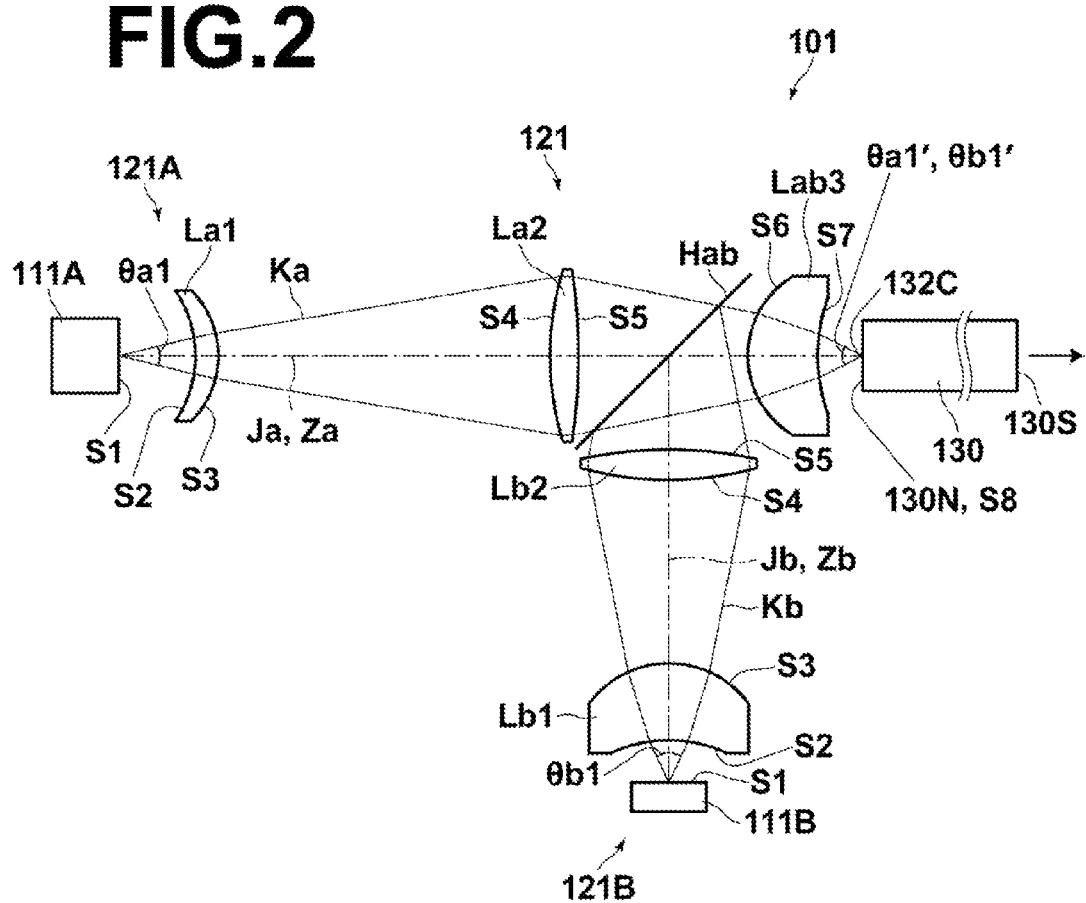
FIG. 2 is a sectional diagram that illustrates Example 1 of an illuminating optical system.

FIG. 2 is a sectional diagram that illustrates an illuminating optical system of Example 1. Example 1 is an illuminating optical system having a total of two light sources including one each of two types of light sources.

The illuminating optical system 101 of Example 1 illustrated in FIG. 2 has a first light source 111A and a second light source 111B, which are two different types of light sources, and a light combining optical system 121 that combines light beams output from the two light sources and causes them to converge at a single position.

Further, the illuminating optical system 101 is equipped with a rod integrator 130a that uniformizes the light intensity distributions of the light beams which are converged at the single position that enter a light input surface 130N at one end thereof and outputs a light beam, of which the light intensity distribution has been uniformized, from a light output surface 130S at a second end thereof.

The light combining optical system 121 has a first relay optical component set 121A that relays a light beam Ka output by the first light source 111A to form a first optical path Ja through which the light beam Ka propagates to converge at a central portion 132C of the light input surface 130N of the rod integrator. The light combining optical system 121 also has a second relay optical component set 121B that relays a light beam Kb output by the second light source 111B to form a second optical path Jb through which the light beam Kb propagates to converge at the central portion 132C of the light input surface 130N of the rod integrator. FIG. 2 illustrates an optical axis Za related to the light beam Ka that passes through the first optical path Ja and an optical axis Zb related to the light beam Kb that passes through the second optical path Jb.

The first relay optical component set 121A and the second relay optical component set 121B have different relay magnification ratios.

The first relay optical component set 121A is constituted by: a first lens La1, a second lens La2, and a third lens Lab3, which are provided in this order from the side of the first light source 111A.

The second relay optical component set 121B is constituted by: a first lens Lb1, a second lens Lb2, and the third lens Lab3, which are provided in this order from the side of the first light source 111B.

Note that the lens provided closest to the rod integrator 130 (the third lens Lab3) within the first relay optical component set 121A is the same as the lens provided closest to the rod integrator 130 (the third lens Lab3) within the second relay optical component set 121B. The third lens Lab3 is utilized in common by the first relay optical component set 121A and the second relay optical component set 121B.

In addition, a dichroic mirror Hab of the light combining optical system 121 is provided between the second lens La2 and the third lens Lab3 of the first relay optical component set 121A and between the second lens Lb2 and the third lens Lab3 of the second relay optical component set 121B. Thereby, the light beam Ka that passes through the first optical path Ja and the light beam Kb that passes through the second optical path Jb are combined.

Table 1A shows lens data of the first relay optical component set 121A that constitutes the first optical path Ja. Table 1B shows lens data of the second relay optical component set 121B that constitutes the second optical path Jb. Note that in Table 1A and Table 1B, the direction toward the light source is designated as a negative direction (− direction), and the direction toward the rod integrator 130 is designated as a positive direction (+ direction).

In each item of lens data shown in Table 1A and Table 1B, surface numbers Si are (i=1, 2, 3, . . . ) lens surface numbers that sequentially increase from the object side to the image side. Note that the lens data also include the positions of the light sources and the position of the light input surface of the rod integrator.

Radii of curvature Ri are the radii of curvature of $i^{th}$ (i=1, 2, 3, . . . ) surfaces. Distances Di are the distances between an $i^{th}$ surface and an $i+1^{st}$ surface along the optical path. The reference numbers Ri and Di correspond to the reference numbers Si (i=1, 2, 3, . . . ) that represent lens surfaces.

Ndj are the refractive indices of $j^{th}$ (j=1, 2, 3, . . . ) optical elements (optical members) with respect to a wavelength of 587.6 nm (d line), and vdj are the Abbe's numbers of $j^{th}$ optical elements (optical members) with respect to the d line.

In the lens data shown in Table 1A and Table 1B, the units for the radii of curvature and the distances between surfaces are mm. The radii of curvature are designated as positive in cases that the surfaces are convex toward the light source, and negative in cases that the surfaces are convex toward the rod integrator.

TABLE 1A

LENS DATA (First Relay Optical Component Set of Example 1 (Optical Path Ja))

| Si Surface Number | Ri Radius of Curvature | Di Distance | Ndj Refractive Index (d line) | vdj Abbe's Number | Remarks |
|---|---|---|---|---|---|
| 1 | 0.000 | 11.77 | | | Light Source Position |
| 2 | −17.833 | 3.51 | 1.8340 | 37.2 | |
| 3 | −14.172 | 50.83 | | | |
| 4 | 44.504 | 4.37 | 1.8340 | 37.2 | |

TABLE 1A-continued

LENS DATA (First Relay Optical Component Set of Example 1 (Optical Path Ja))

| Si Surface Number | Ri Radius of Curvature | Di Distance | Ndj Refractive Index (d line) | vdj Abbe's Number | Remarks |
|---|---|---|---|---|---|
| 5 | −89.448 | 25.99 | | | |
| 6 | 14.238 | 10.72 | 1.8340 | 37.2 | |
| 7 | 26.796 | 6.87 | | | |
| 8 | 0.000 | | | | Rod Input Position |

TABLE 1B

LENS DATA (Second Relay Optical Component Set of Example 1 (Optical Path Jb))

| Si Surface Number | Ri Radius of Curvature | Di Distance | Ndj Refractive Index (d line) | vdj Abbe's Number | Remarks |
|---|---|---|---|---|---|
| 1 | 0.000 | 6.52 | | | Light Source Position |
| 2 | −21.081 | 11.81 | 1.8340 | 37.2 | |
| 3 | −15.221 | 28.15 | | | |
| 4 | 50.583 | 4.68 | 1.8340 | 37.2 | |
| 5 | −62.779 | 26.51 | | | |
| 6 | 14.238 | 10.72 | 1.8340 | 37.2 | |
| 7 | 26.796 | 6.87 | | | |
| 8 | 0.000 | | | | Rod Input Position |

In addition, Table 2 shows data related to the operation of the relay optical component sets. More specifically, Table 2 shows the relationships among the sizes of the light emitting regions of the light sources 111A and 111B, the spreading angles θa1 and θa2 of the light beams output from the light sources, the relay magnification ratios of the relay optical component sets 121A and 121B, the optical images of the light emitting regions that enter the light input surface 130N of the rod integrator 130, and converging angles θa1' and θa2'.

The value (BH/BL=1.8) which is derived from Conditional Formula (A): BH/BL>1.05 in Example 1 is indicated below Table 1.

Note that the ratio between the greatest value and the smallest value of the "sizes of the light emitting regions" of the first optical path Ja and the second optical path Jb 0.77 (0.77=11.0/14.3) and the ratio between greatest value and the smallest value of the "sizes of the optical images" formed by the first optical path Ja and the second optical path Jb 0.73 (0.73=7.2/9.9) are equivalent in their proximity to "ratio=1". This is because matching of the "converging angles" was prioritized over matching of the "sizes of the optical images".

That is, with respect to the "converging angles", the ratio between the maximum value and the minimum value of the "converging angle" in the first optical path Ja and the second optical path 0.88 (0.88=38.9/44.0) is closer to "ratio=1" than the ratio between the maximum value and the minimum value of the "spreading angle" in the first optical path Ja and the second optical path Jb 0.50 (0.50=20.0/40.0). Therefore, it can be understood that the "converging angles" are matched.

Here, the relay magnification ratios of the relay optical component sets are set such that the sizes of the optical images of the light emitting regions which are formed by passing through the relay optical component sets and the converging angles of the light beams that enter the rod integrator are balanced. That is, the relay magnification ratios the relay magnification ratios are set such that the sizes of the optical images and the converging angles result in smaller variations in the light intensity distribution of a (combined) light beam formed by passing the light beams through the rod integrator.

As described above, the illuminating optical system of the present invention is not limited to matching both the "sizes of the optical images" and the "converging angles", but may match only one of the two.

TABLE 2

Data Related to the Operations of Relay Optical Component Sets (Example 1)

| Type of Optical System | Size of Light Emitting Region (length: mm) | Spreading Angle (total angle: degrees) | Relay Magnification | Size of Optical Image (length: mm) | Converging Angle (total angle: degrees) |
|---|---|---|---|---|---|
| First Optical Path Ja First Relay Optical Component Set | 14.3 | 20.0 (θa1) | 0.50 | 0.72 | 38.9 (θa1') |
| Second Optical Path Jb Second Relay Optical Component Set | 11.0 | 40.0 (θb1) | 0.90 | 9.9 | 44.0 (θb1') |

*Conditional Formula (A): BH/BL > 1.05; BH/BL = 1.8

Figure 3:
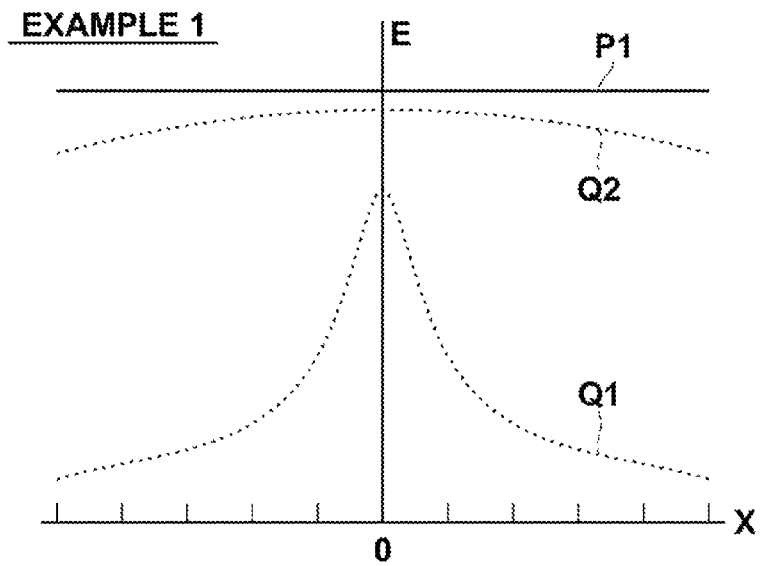
FIG. 3 is a diagram that illustrates the light intensity distributions of light beams (illuminating light) output by the illuminating optical system of Example 1.

FIG. 3 is a diagram that illustrates the light intensity distribution of the illuminating light beam output from the light output surface 130S on a coordinate plane having positions (X) along a line that passes along the light output surface 130S of the rod integrator 130 as the horizontal axis and light intensity (E) as the vertical axis. Note that the origin 0 in the direction of the position (X) in FIG. 3 corresponds to the center position of the light output surface 130S.

FIG. 3 illustrates a comparison among the light intensity distribution P1 (solid line) of the illuminating light beam which is output by the rod integrator in the case that the relay magnification ratios of the relay optical component sets are adjusted appropriately, and the light intensity distribution Q1 (broken line) of the light beam Ka that passes through the first optical path Ja and the light intensity distribution Q2 (broken line) of the light beam Kb that passes through the second optical path Jb in the case that the relay magnification ratios of the relay optical component sets are set to be the same.

More specifically, the light intensity distribution P1 (solid line) of the illuminating light beam is the light intensity distribution of a combined illuminating light beam which is output from the light output surface 130 of the rod integrator when the optical axes of the light combining optical system 120 (the optical axes of the relay optical component sets 121A and 121B) are caused to match the optical axis of the rod integrator 130, and the relay magnification ratios of the relay optical component sets 121A and 121B are adjusted such that sizes of the optical images of the light emitting regions formed on the light input surface 130 and the converging angles of the light beams are matched.

As can be understood from Table 2 and FIG. 3, the light intensity of the illuminating light beam output from the light output surface 130S can be uniformized by matching the sizes of the optical images of light emitting regions, which are formed by light beams that pass through each relay optical component set, and by matching the converging angles of the light beams that enter the light input surface 130N. Thereby, illumination fluctuations of the illuminating light beam output from the light output surface 130S can be suppressed. At the same time, it can be understood that deterioration in the utilization efficiency of the illuminating light beam output by the illuminating optical system can also be suppressed.

Example 2

Next, Example 2 will be described.

Figure 4:
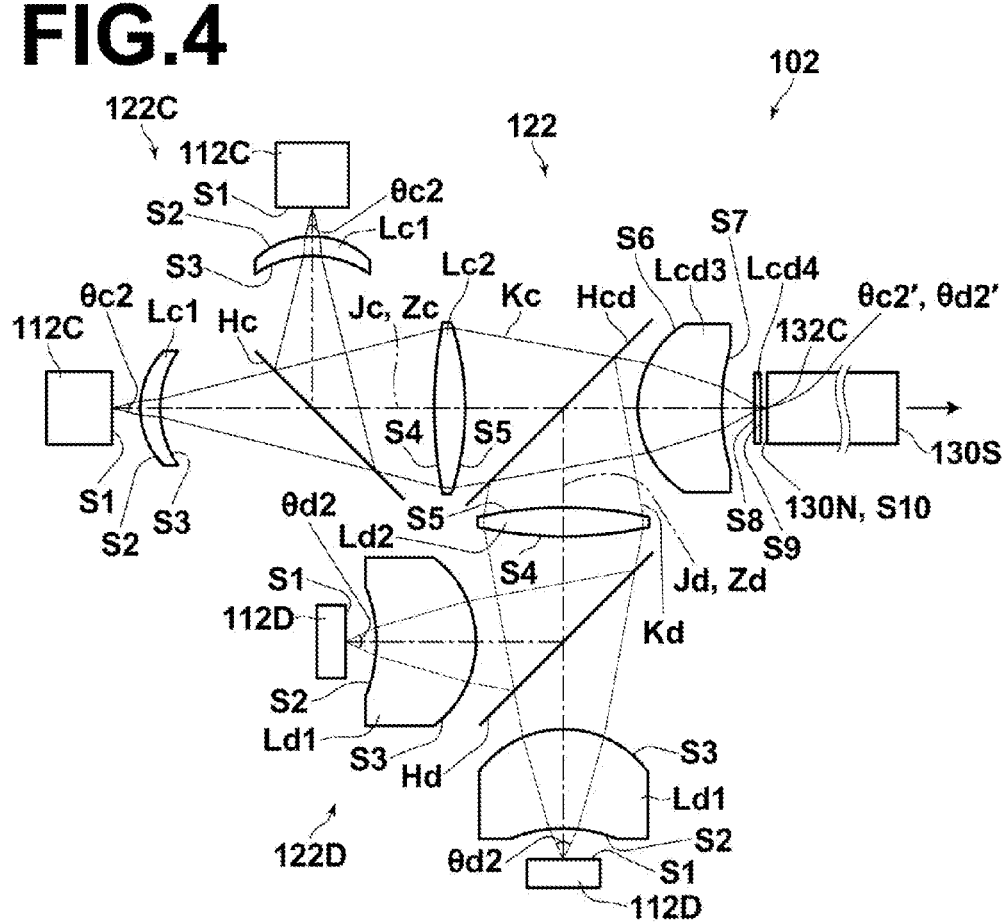
FIG. 4 is a sectional diagram that illustrates Example 2 of an illuminating optical system.

FIG. 4 is a sectional diagram that illustrates an illuminating optical system 102 of Example 2. Note that constituent elements of Example 2 which are the same as those of Example 1 are denoted by the same reference numerals, and detailed descriptions thereof will be omitted.

The illuminating optical system 102 of Example 2 has a total of four light sources including two first light sources 112C of a first type, and two second light sources 112D of a second type.

Note that the light sources of the same type are those having at least light emitting regions of the same size, the same spreading angles of light beams output therefrom, and the same colors.

A light combining means 122 combines light beams output from the two first light sources 112C and the two second light sources 112D, and causes them to converge at a single position.

The light beams which are converged at the single position are caused to enter the rod integrator 130.

The light combining optical system 122 has a first relay optical component set 122C that relays light beams Kc output by the two first light sources 112C to form a first optical path Jc through which the light beams Kc propagate to converge at a central portion 132C of the light input surface 130N of the rod integrator. The light combining optical system 122 also has a second relay optical component set 122D that relays light beams Kd output by the two second light sources 112D to form a second optical path Jd through which the light beams Kd propagate to converge at the central portion 132C of the light input surface 130N of the rod integrator.

FIG. 4 illustrates an optical axis Zc related to the light beams Kc that pass through the first optical path Jc and an optical axis Zd related to the light beams Kd that pass through the second optical path Jd.

The first relay optical component set 122C and the second relay optical component set 122D have different relay magnification ratios.

The first relay optical component set 122C is constituted by: a first lens Lc1, a second lens Lc2, a third lens Lcd3, and a planar plate Lcd4, which are provided in this order from the side of the first light sources 112C.

Note that the optical paths from the two first light sources 112C to the rod integrator 130 are the same from the viewpoint of lens design, and therefore the two will be described together as one.

In addition, the optical paths from the two first light sources 112D to the rod integrator 130 are also the same from the viewpoint of lens design, and therefore the two will be described together as one.

The second relay optical component set 122D is constituted by: a first lens Ld1, a second lens Ld2, the third lens Lcd3, and the planar plate Lcd4, which are provided in this order from the side of the first light sources 112D.

Note that the lens provided closest to the rod integrator 130 (the third lens Lcd3) and the planar plate Lcd4 within the first relay optical component set 122C are the same as the lens provided closest to the rod integrator 130 (the third lens Lcd3) and the planar plate Lcd4 within the second relay optical component set 122D. The third lens Lcd3 and the planar plate Lcd4 are utilized in common by the first relay optical component set 122C and the second relay optical component set 122D.

In addition, a dichroic mirror Hcd of the light combining optical system 122 is provided between the second lens Lc2 and the third lens Lcd3 of the first relay optical component set 122C and between the second lens Ld2 and the third lens Lcd3 of the second relay optical component set 122D. Thereby, the light beams Kc that pass through the first optical path Jc and the light beams Kd that pass through the second optical path Jd are combined.

Further, a polarizing mirror Hc is provided between the first lens Lc1 and the second lens Lc2 of the first relay optical component set 122C. Thereby, the light beams output by the two first light sources 112C are combined. Similarly, a polarizing mirror Hd is provided between the first lens Ld1 and the second lens Ld2 of the second relay optical component set 122D. Thereby, the light beams output by the two second light sources 112D are combined.

Table 3C shows lens data of the first relay optical component set 122C that constitutes the first optical path Jc. Table 3D shows lens data of the second relay optical component set 122D that constitutes the second optical path Jd. The lens data shown in Table 3C and Table 3D are obtained in the same manner as the lens data shown in Tables 1A and 1B, which were described with respect to Example 1, and therefore detailed descriptions thereof will be omitted.

TABLE 3C

LENS DATA (First Relay Optical Component Set of Example 2 (Optical Path Jc))

| Si Surface Number | Ri Radius of Curvature | Di Distance | Ndj Refractive Index (d line) | vdj Abbe's Number | Remarks |
|---|---|---|---|---|---|
| 1 | 0.000 | 4.50 | | | Light Source Position |
| 2 | 12.877 | 3.13 | 1.8340 | 37.2 | |
| 3 | 15.766 | 43.07 | | | |
| 4 | 69.339 | 4.92 | 1.8340 | 37.2 | |
| 5 | −42.374 | 27.11 | | | |
| 6 | 15.625 | 13.15 | 1.8340 | 37.2 | |
| 7 | 33.333 | 5.20 | | | |
| 8 | 0.000 | 1.00 | 1.5163 | 64.1 | |
| 9 | 0.000 | 1.00 | | | |
| 10 | 0.000 | | | | Rod Input Position |

TABLE 3D

LENS DATA (Second Relay Optical Component Set of Example 2 (Optical Path Jd))

| Si Surface Number | Ri Radius of Curvature | Di Distance | Ndj Refractive Index (d line) | vdj Abbe's Number | Remarks |
|---|---|---|---|---|---|
| 1 | 0.000 | 4.87 | | | Light Source Position |
| 2 | −22.461 | 15.65 | 1.8340 | 37.2 | |
| 3 | −16.535 | 30.34 | | | |
| 4 | 62.522 | 4.54 | 1.8340 | 37.2 | |
| 5 | −61.615 | 27.34 | | | |
| 6 | 15.625 | 13.14 | 1.8340 | 37.2 | |
| 7 | 33.333 | 5.20 | | | |
| 8 | 0.000 | 1.00 | 1.5163 | 64.1 | |
| 9 | 0.000 | 1.00 | | | |
| 10 | 0.000 | | | | Rod Input Position |

In addition, Table 4 shows data related to the operation of the relay optical component sets. Note that the data shown in Table 4 were also obtained in the same manner as the data in Table 2, which were described with respect to Example 1, and therefore detailed descriptions thereof will be omitted.

TABLE 4

Data Related to the Operations of Relay Optical Component Sets (Example 2)

| Type of Optical System | Size of Light Emitting Region (length: mm) | Spreading Angle (total angle: degrees) | Relay Magnification | Size of Optical Image (length: mm) | Converging Angle (total angle: degrees) |
|---|---|---|---|---|---|
| First Optical Path Jc First Relay Optical Component Set | 10.0 | 20.0 (θc2) | 0.50 | 5.0 | 38.9 (θc2') |
| Second Optical Path Jd Second Relay Optical Component Set | 6.0 | 35.0 (θd2) | 0.90 | 5.4 | 38.6 (θd2') |

*Conditional Formula (A): BH/BL > 1.05; BH/BL = 1.8

Figure 5:
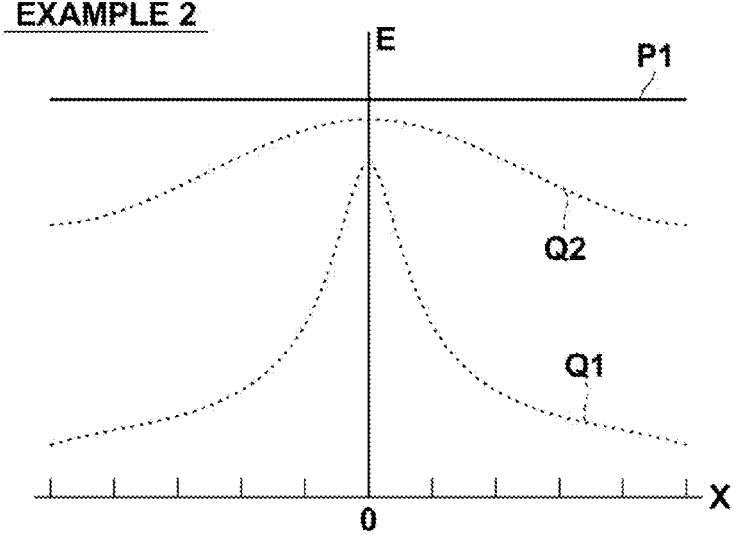
FIG. 5 is a diagram that illustrates the light intensity distributions of a light beams (illuminating light) output by the illuminating optical system of Example 2.

FIG. 5 is a diagram that illustrates the light intensity distribution of the illuminating light beam output from the light output surface 130S. that is, FIG. 5 illustrates a comparison among the light intensity distribution P1 (solid line) of the illuminating light beam which is output by the rod integrator in the case that the relay magnification ratios of the relay optical component sets 122C and 122D are adjusted such that sizes of the optical images of the light emitting regions formed on the light input surface 130 and the converging angles of the light beams are matched, and the light intensity distribution Q1 (broken line) of the light beam Kc that passes through the first optical path Jc and the light intensity distribution Q2 (broken line) of the light beam Kd that passes through the second optical path Jd in the case that the relay magnification ratios of the relay optical component sets are set to be the same. Note that FIG. 5 is a diagram which was produced in the same manner as FIG. 3, which was described with respect to Example 1, and therefore a detailed description thereof will be omitted.

As can be understood from Table 4 and FIG. 5, deterioration in the utilization efficiency of the illuminating light beam output by the illuminating optical system 102 and illumination fluctuations in the illuminating light can be suppressed, by matching the sizes of the optical images of the light emitting regions and the converging angles of the light beams.

Example 3

Next, Example 3 will be described.

Figure 6:
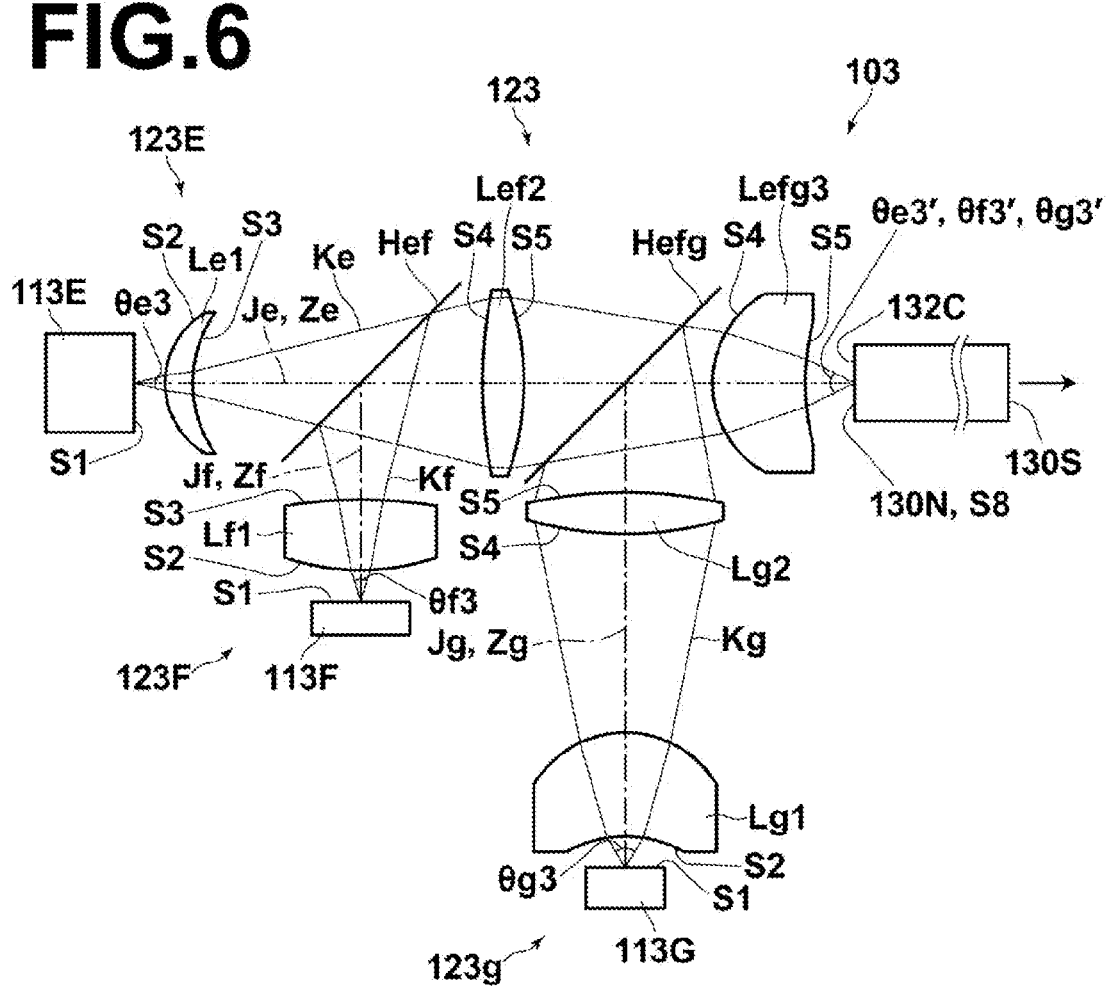
FIG. 6 is a sectional diagram that illustrates Example 3 of an illuminating optical system.

FIG. 6 is a sectional diagram that illustrates an illuminating optical system 103 of Example 3. Note that constituent elements of Example 3 which are the same as those of Example 1 are denoted by the same reference numerals, and detailed descriptions thereof will be omitted.

The illuminating optical system 103 of Example 3 has a total of three light sources of three different types, which are a first light source 113E, a second light source 113F, and a third light source 113G.

A light combining means 123 combines light beams output from the first light source 113E, the second light source 113F, and the third light source 113G, and causes them to converge at a single position.

The light beams which are converged at the single position are caused to enter the light input surface 130N of the rod integrator 130.

The light combining optical system 123 has a first relay optical component set 123E that relays a light beam Ke output by the first light source 113E to form a first optical path Je through which the light beam Ke propagates to converge at the central portion 132C of the light input surface 130N of the rod integrator. The light combining optical system 123 also has a second relay optical component set 123F that relays light beams Kf output by the second light source 113F to form a second optical path Jf through which the light beam Kf propagates to converge at the central portion 132C of the light input surface 130N of the rod integrator. Further, the light combining optical system 123 has a third relay optical component set 123G that relays light beams Kg output by the third light source 113G to form a third optical path Jg through which the light beam Kg propagates to converge at the central portion 132C of the light input surface 130N of the rod integrator.

FIG. 6 illustrates an optical axis Ze related to the light beam Ke that passes through the first optical path Je, an optical axis Zf related to the light beam Kf that passes through the second optical path Jf, and an optical axis Zg related to the light beam Kg that passes through the third optical path Jg.

The first relay optical component set 123E, the second relay optical component set 123F, and the third relay optical component set 123G have different relay magnification ratios.

The first relay optical component set 123E is constituted by: a first lens Le1, a second lens Le2, and a third lens Lefg3, which are provided in this order from the side of the first light source 113E.

The second relay optical component set 123F is constituted by: a first lens Lf1, the second lens Lef2, and the third lens Lefg3, which are provided in this order from the side of the first light source 113F.

The third relay optical component set 123G is constituted by: a first lens Lg1, a second lens Lg2, and the third lens Lefg3, which are provided in this order from the side of the first light source 113G.

Note that the third lens Lefg3 lens provided closest to the rod integrator 130 within the first relay optical component set 123E, the third lens Lefg3 lens provided closest to the rod integrator 130 within the second relay optical component set 123F, and the third lens Lefg3 lens provided closest to the rod integrator 130 within the third relay optical component set 123G are the same.

In addition, a dichroic mirror Fief of the light combining optical system 123 is provided between the first lens Le1 and the second lens Le2 of the first relay optical component set 123E and between the first lens Lf1 and the second lens Lf2 of the second relay optical component set 123F. Thereby, the light beam Ke that passes through the first optical path Je and the light beams Kf that passes through the second optical path Jf are combined.

Further, a dichroic mirror Hefg of the light combining optical system 123 is provided between the second lens Left and the third lens Lefg3 of the second relay optical component set 123F and between the second lens Lg2 and the third lens Lefg3 of the third relay optical component set 123G. Thereby, the light beams output by the three types of light sources are combined.

Table 5E shows lens data of the first relay optical component set 123E that constitutes the first optical path Je. In addition, Table 5F shows lens data of the second relay optical component set 123F that constitutes the second optical path Jf. Further, Table 5G shows lens data of the third relay optical component set 123G that constitutes the second optical path Jg.

Note that Table 5E, Table 5F, and Table 5G were produced in the same manner as Tables 1A and 1B, which were described with respect to Example 1, and therefore detailed descriptions thereof will be omitted.

TABLE 5E

LENS DATA (First Relay Optical Component Set of Example 3 (Optical Path Je))

| Si Surface Number | Ri Radius of Curvature | Di Distance | Ndj Refractive Index (d line) | vdj Abbe's Number | Remarks |
|---|---|---|---|---|---|
| 1 | 0.000 | 4.50 | | | Light Source Position |
| 2 | 11.916 | 4.00 | 1.4875 | 70.2 | |
| 3 | 17.731 | 42.09 | | | |
| 4 | 68.185 | 6.00 | 1.7725 | 49.6 | |
| 5 | −40.240 | 27.38 | | | |
| 6 | 14.909 | 13.50 | 1.7725 | 49.6 | |
| 7 | 35.724 | 7.16 | | | |
| 8 | 0.000 | | | | Rod Input Position |

TABLE 5F

LENS DATA (Second Relay Optical Component Set of Example 3 (Optical Path Jf))

| Si Surface Number | Ri Radius of Curvature | Di Distance | Ndj Refractive Index (d line) | vdj Abbe's Number | Remarks |
|---|---|---|---|---|---|
| 1 | 0.000 | 4.57 | | | Light Source Position |
| 2 | 33.957 | 10.25 | 1.4875 | 70.2 | |
| 3 | −68.902 | 34.68 | | | |

TABLE 5F-continued

LENS DATA (Second Relay Optical Component Set of Example 3 (Optical Path Jf))

| Si Surface Number | Ri Radius of Curvature | Di Distance | Ndj Refractive Index (d line) | vdj Abbe's Number | Remarks |
|---|---|---|---|---|---|
| 4 | 68.185 | 6.00 | 1.7725 | 49.6 | |
| 5 | −40.240 | 27.38 | | | |
| 6 | 14.909 | 13.50 | 1.7725 | 49.6 | |
| 7 | 35.724 | 7.16 | | | |
| 8 | 0.000 | | | | Rod Input Position |

TABLE 5G

LENS DATA (Third Relay Optical Component Set of Example 3 (Optical Path Jg))

| Si Surface Number | Ri Radius of Curvature | Di Distance | Ndj Refractive Index (d line) | vdj Abbe's Number | Remarks |
|---|---|---|---|---|---|
| 1 | 0.000 | 4.54 | | | Light Source Position |
| 2 | −17.484 | 15.10 | 1.7725 | 49.6 | |
| 3 | −15.455 | 28.92 | | | |
| 4 | 51.271 | 6.00 | 1.7725 | 49.6 | |
| 5 | −67.357 | 28.60 | | | |
| 6 | 14.909 | 13.50 | 1.7725 | 49.6 | |
| 7 | 35.724 | 7.16 | | | |
| 8 | 0.000 | | | | Rod Input Position |

In addition, Table 6 shows data related to the operation of the relay optical component sets. Note that Table 6 was produced in the same manner as Table 2, which was described with respect to Example 1, and therefore a detailed description will be omitted.

TABLE 6

Data Related to the Operations of Relay Optical Component Sets (Example 3)

| Type of Optical System | Size of Light Emitting Region (length: mm) | Spreading Angle (total angle: degrees) | Relay Magnification | Size of Optical Image (length: mm) | Converging Angle (total angle: degrees) |
|---|---|---|---|---|---|
| First Optical Path Je First Relay Optical Component Set | 9.0 | 20.0 (θe3) | 0.50 | 4.5 | 38.9 (θe1') |
| Second Optical Path Jf Second Relay Optical Component Set | 7.5 | 25.0 (θf3) | 0.60 | 4.5 | 40.6 (θf3') |
| Third Optical Path Jg Second Relay Optical Component Set | 5.0 | 38.0 (θg3) | 0.90 | 4.5 | 41.9 (θg3') |

*Conditional Formula (A): BH/BL > 1.05; BH/BL = 1.8

Figure 7:
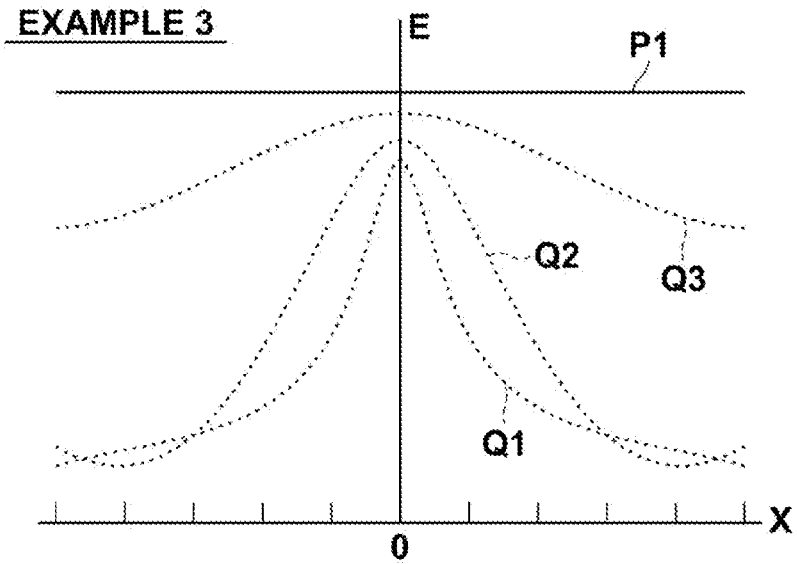
FIG. 7 is a diagram that illustrates the light intensity distributions of light beams (illuminating light) output by the illuminating optical system of Example 3.

FIG. 7 is a diagram that illustrates the light intensity distribution of the illuminating light beam output from the light output surface 130S. that is, FIG. 7 illustrates a comparison among the light intensity distribution P1 (solid line) of the illuminating light beam which is output by the rod integrator in the case that the relay magnification ratios of the relay optical component sets 123E, 123F, and 123G are adjusted such that sizes of the optical images of the light emitting regions formed on the light input surface 130 and the converging angles of the light beams are matched, and the light intensity distribution Q1 (broken line) of the light beam Ke that passes through the first optical path Je, the light intensity distribution Q2 (broken line) of the light beam Kf that passes through the second optical path Jf, and the light intensity distribution Q3 (broken line) of the light beam Kg that passes through the third optical path Jg in the case that the relay magnification ratios of the relay optical component sets are set to be the same. Note that FIG. 7 is a diagram which was produced in the same manner as FIG. 3, which was described with respect to Example 1, and therefore a detailed description thereof will be omitted.

As can be understood from Table 6 and FIG. 7, deterioration in the utilization efficiency of the illuminating light beam output by the illuminating optical system 103 and illumination fluctuations in the illuminating light can be suppressed, by matching the sizes of the optical images of the light emitting regions and the converging angles of the light beams.

As described above, the illuminating optical system and the projection display apparatus of the present invention can suppress deterioration in the utilization efficiency of illuminating light and generation of illumination fluctuations (light intensity fluctuations and color fluctuations) without increasing the size of an apparatus.

What is claimed is:

1. An illuminating optical system, comprising:
a plurality of light sources including at least one light source which is of a different type than other light sources;
a light combining optical system that combines light beams output from the light sources such that they converge at a single position; and
a rod integrator that uniformizes the light intensity distributions of the light beams which are converged at the single position that enter a first end thereof and outputs a light beam, of which the light intensity distribution has been uniformized, from a second end thereof;

the light combining optical system comprising relay optical component sets corresponding to each of the light sources; and at least one of the relay optical component sets having a relay magnification ratio different from those of other relay optical component sets.

2. An illuminating optical system as defined in claim 1, wherein:

the relay magnification ratios satisfy the following conditional formula (A)

$$BH/BL>1.05 \tag{A}$$

wherein BH is the highest relay magnification ratio from among the relay magnification ratios of the relay optical component sets, and BL is the lowest relay magnification ratio from among the relay magnification ratios of the relay optical component sets.

3. An illuminating optical system as defined in claim 1, wherein:

the light sources of different types are those that have light emitting regions of different sizes; and the relay magnification ratios of the relay optical component sets are set such that the sizes of optical images of the light emitting regions which are formed when the light beams pass through the relay optical component sets are matched.

4. An illuminating optical system as defined in claim 1, wherein:

the light sources of different types are those that output light beams having different spreading angles; and the relay magnification ratios of the relay optical component sets are set such that the converging angles of the light beams that enter the rod integrator are matched.

5. An illuminating optical system as defined in claim 1, wherein:

the light sources of different types are those that have light emitting regions of different sizes and/or those that output light beams having different spreading angles; and the relay magnification ratios of the relay optical component sets are set such that the sizes of optical images of the light emitting regions which are formed when the light beams pass through the relay optical component sets and the converging angles of the light beams that enter the rod integrator become balanced.

6. An illuminating optical system as defined in claim 1, wherein:

the light sources of different types are those that output light of different colors.

7. An illuminating optical system as defined in claim 1, wherein:

a lens which is provided most proximate to the rod integrator from among the relay optical component sets is utilized in common by all of the relay optical component sets.

8. An illuminating optical system as defined in claim 1, wherein:

the lengths of the optical paths from each of the plurality of light sources to a light input surface of the rod integrator are the same.

9. An illuminating optical system as defined in claim 1, wherein:

the light sources are LED light sources.

10. An illuminating optical system as defined in claim 1, wherein:

the light sources are laser light sources.

11. An illuminating optical system as defined in claim 1, wherein:

the rod integrator is a solid rod.

12. An illuminating optical system as defined in claim 1, wherein:

the rod integrator is a hollow rod.

13. An illuminating optical system as defined in claim 2, wherein:

the relay magnification ratios satisfy the following conditional formula (A1)

$$BH/BL \geq 1.2 \tag{A1}$$

14. An illuminating optical system as defined in claim 2, wherein:

the relay magnification ratios satisfy the following conditional formula (A2)

$$BH/BL \geq 1.8 \tag{A2}$$

15. An illuminating optical system as defined in claim 2, wherein:

the relay magnification ratios satisfy the following conditional formula (A')

$$5.0 \geq BH/BL > 1.05 \tag{A'}$$

16. An illuminating optical system as defined in claim 2, wherein:

the relay magnification ratios satisfy the following conditional formula (A1')

$$5.0 \geq BH/BL > 1.2 \tag{A1'}$$

17. An illuminating optical system as defined in claim 2, wherein:

the relay magnification ratios satisfy the following conditional formula (A2')

$$5.0 \geq BH/BL > 1.8 \tag{A2'}$$

18. A projection display apparatus, comprising:

the illuminating optical system defined in claim 1;

light modulating elements which are illuminated by an illuminating light beam output by the illuminating optical system that modulate the illuminating light beam; and a projection lens that projects light beams which are modulated by the light modulating elements that represent image information.

* * * * *